US012626860B1

(12) United States Patent
Sheridan

(10) Patent No.: US 12,626,860 B1
(45) Date of Patent: May 12, 2026

(54) MULTICONFIGURATION IGNITION COIL AND COIL CAP ADAPTER

(71) Applicant: Bradley Sheridan, Cedar Park, TX (US)

(72) Inventor: Bradley Sheridan, Cedar Park, TX (US)

( * ) Notice: Subject to any disclaimer, the term of this patent is extended or adjusted under 35 U.S.C. 154(b) by 1029 days.

(21) Appl. No.: 17/749,066

(22) Filed: May 19, 2022

(51) Int. Cl.
*H01F 38/12* (2006.01)
*H01F 27/02* (2006.01)
*H01F 27/29* (2006.01)
*H01F 41/02* (2006.01)

(52) U.S. Cl.
CPC ............. *H01F 38/12* (2013.01); *H01F 27/02* (2013.01); *H01F 27/29* (2013.01); *H01F 41/02* (2013.01)

(58) Field of Classification Search
None
See application file for complete search history.

(56) References Cited

U.S. PATENT DOCUMENTS 3,876,884 A 4/1975 Housman
4,281,214 A * 7/1981 Miyamoto .............. H01F 27/04 200/19.38
5,188,088 A 2/1993 Stamm
6,378,514 B1 4/2002 Kaminaga
6,545,453 B2 4/2003 Glinkowski
2016/0252024 A1 9/2016 Gruell
2021/0148324 A1 * 5/2021 Sheridan .................. F02P 3/09

FOREIGN PATENT DOCUMENTS

CN 2072159 2/1991
EP 0813998 12/1997
JP S5626420 A * 3/1981 ............ H01F 38/12

OTHER PUBLICATIONS

USPTO, File History of U.S. Appl. No. 17/099,384, as of Jun. 7, 2022, US.

* cited by examiner

*Primary Examiner* — Tho D Ta
(74) *Attorney, Agent, or Firm* — The Law Office of Austin Bonderer, PC; Austin Bonderer

(57) ABSTRACT

The multiconfiguration ignition coil and the coil cap provide a user with way to modify the workings of an engine. The multiconfiguration ignition coil has a transformer, a housing, a multiconfiguration ignition coil power wire terminal, a multiconfiguration ignition coil signal wire terminal, a multiconfiguration ignition coil high voltage output, a wire harness connector, and internal wiring. The internal wiring can accept a signal from the multiconfiguration ignition coil signal wire terminal, transmit the signal to the wire harness connector, accept a second signal from the wire harness connector that is able to control output from the multiconfiguration ignition coil high voltage output. The internal wiring can also or alternatively accept a first voltage level from the multiconfiguration ignition coil power wire terminal, transmit the first voltage level to the wire harness connector, accept a second voltage level from the wire harness connector that is able to power the transformer.

9 Claims, 11 Drawing Sheets

MULTICONFIGURATION IGNITION COIL AND COIL CAP ADAPTER

FIELD

The subject matter herein generally relates to an apparatus and method to easily allow a user to upgrade their ignition. Spark ignition-based internal combustion engines use an ignition coil to create the high voltage spark and some control method to control the coil to create the spark. These control methods require several wires to interface from the car and the ignition controller to the coil. A common method of improving the ignition performance has been to add a capacitive discharge ignition into an existing ignition circuit. These are added by wiring them into the wiring harness between the ignition controller and the coil. Other methods of improving the ignition performance involve increasing the voltage supply to the coil or adjusting the control signal to the coil.

BACKGROUND

For decades, the capacitive discharge ignition has been a common aftermarket item added to engines in automotive and other applications. These provide improvements to several spark characteristics to improve the operation of the engine. These capacitive discharge ignitions are added to an existing ignition system by splicing in several wires between the car wiring and ignition controller (points, electronic, or other) and the coil. These wires are cut/intercepted individually by the installer, often the vehicle owner with limited understanding of the ignition electronics. Incorrectly connecting any of this wiring could cause malfunction and/or damage to the car, capacitive discharge ignition, or both. Incorrect wiring is a common problem that people encounter when performing these ignition upgrades. Cutting and splicing wiring into the harness is also undesirable from the standpoint of damaging the original wiring and being more difficult to undo.

BRIEF DESCRIPTION OF THE DRAWINGS

Implementations of the present technology will now be described, by way of example only, with reference to the attached figures, wherein.

DETAILED DESCRIPTION

Figure 1:
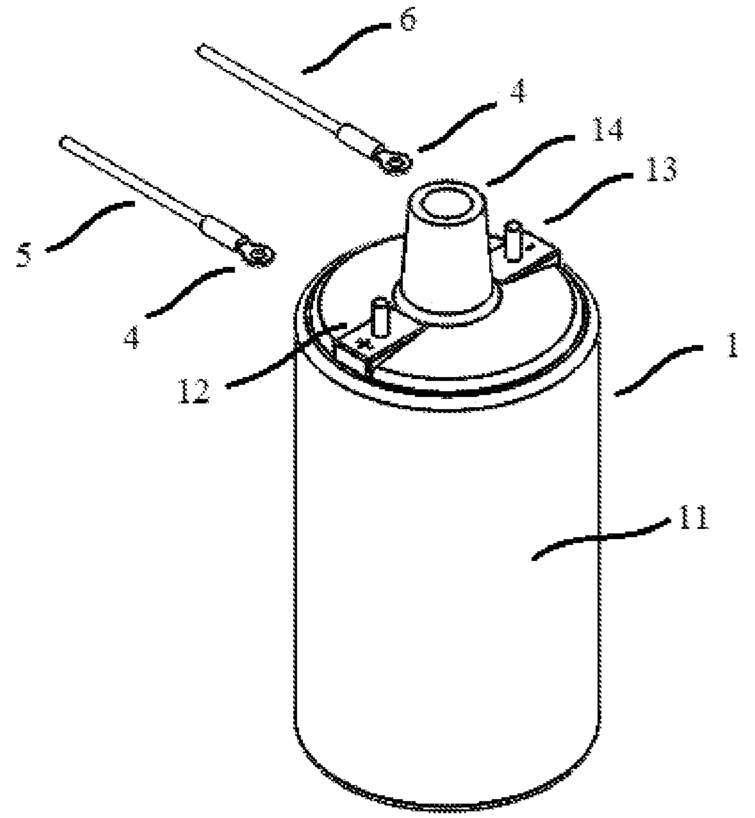
FIGURE 1 (PRIOR ART)
FIG. 1 shows an automotive ignition coil according to the prior art.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether integral with, directly attached, or indirectly attached through intervening components, and is not necessarily limited to physical connections. The connection can be such that the objects are permanently connected or releasably connected. The term "electrically coupled" is defined as being in structural electrical contact, whether in direct contact, without intervening components, or indirectly through intervening components, to allow the flow of electrons between the respective elements. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series, and the like.

The present disclosure is described in relation to a replacement or an attachment that can be used to improve the ignition system of automobiles and methods related thereto.

FIG. 1 illustrates prior art showing a standard ignition coil 1 and some wiring originally attached to it. The ignition coil 1 comprises a transformer, body 11, a power wire input terminal 12, a signal wire input terminal 13, and a high voltage output 14. The high voltage output 14 is where the ignition coil 1 couple to the ignition distributor (not shown) to deliver the spark voltage to the engine. The power wire 5 provides the operating voltage to the ignition coil 1 when the ignition is switched on. The power wire 5 connects to the power wire input terminal 12, often using a ring terminal 4. There is a signal wire 6 that is typically connected to points output from the ignition distributor (not shown). The signal wire 6 connects to the signal wire input terminal 13 on the coil, typically using a ring terminal 4, with a nut (not shown) to secure the ring terminal 4 to the coil post. The ignition coil 1 comprises a transformer.

Figure 2:
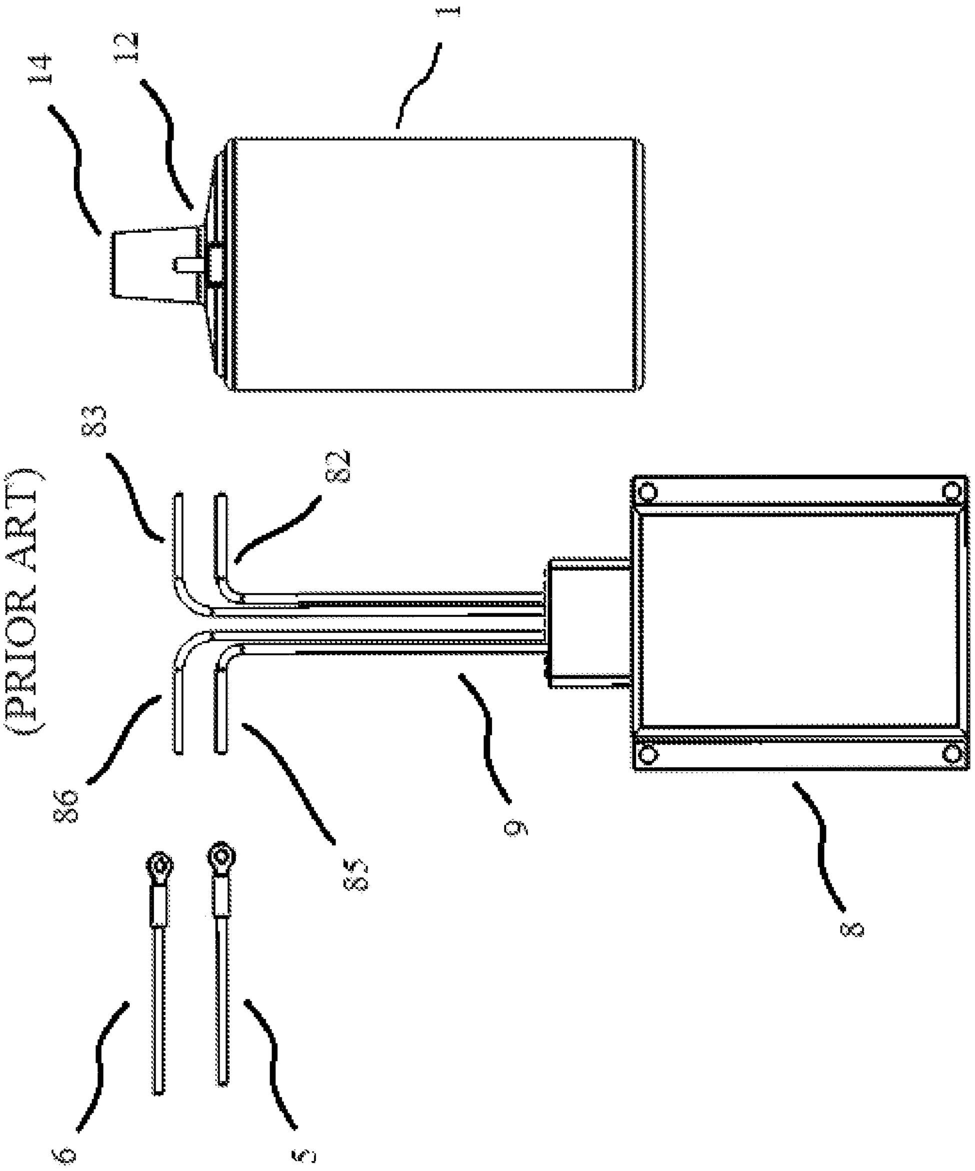
FIGURE 2 (PRIOR ART)
FIG. 2 shows a schematic of an automotive ignition coil and a capacitive discharge ignition according to the prior art.

FIG. 2 illustrates prior art having the same standard ignition coil 1 in combination with capacitive discharge ignition 8. In order to add the capacitive discharge ignition 8, signal wire 6 and capacitive discharge ignition signal wire 86, power wire 5, and the capacitive discharge ignition power wire 85 have to be spiced together. Then capacitive discharge power line output 82 and capacitive discharge signal output 83 must be manually connected to power wire input terminal 12 and the signal wire input terminal 13, respectively. A user must properly attach all these wires for the ignition to work properly and prevent damage. While it seems simple in a wiring diagram, mistakes often occur under the hood of a vehicle. Incorrect wiring could lead to damaged vehicle wiring or components.

Figure 3:
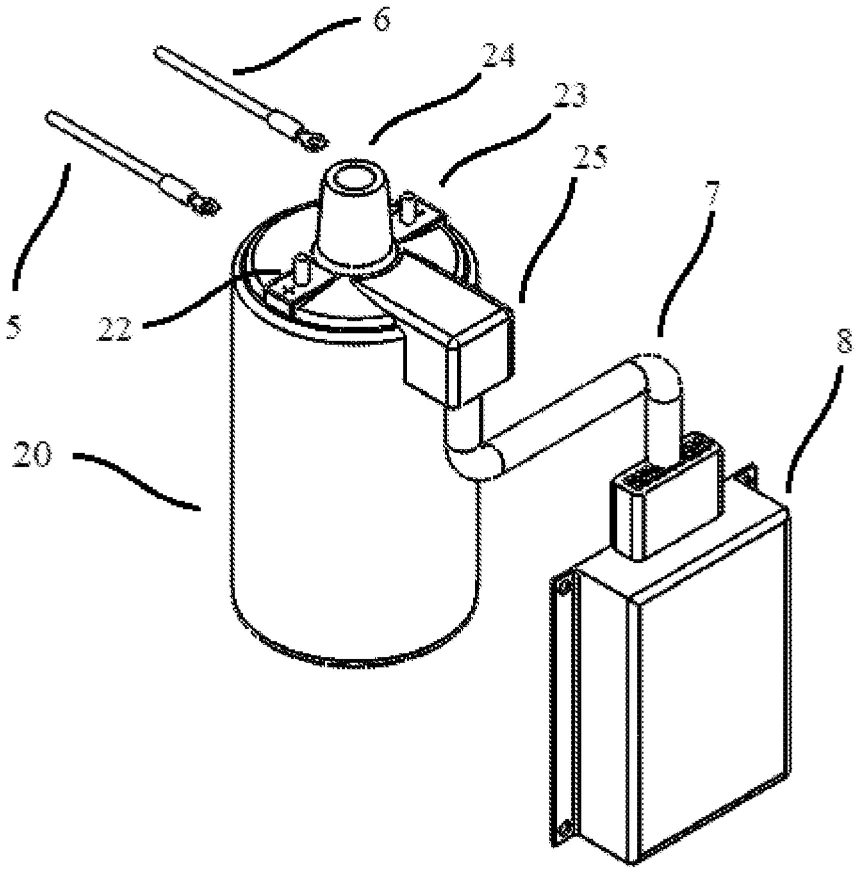
FIG. 3 shows an embodiment of a multiconfiguration coil with a capacitive discharge ignition.
Figure 4A:
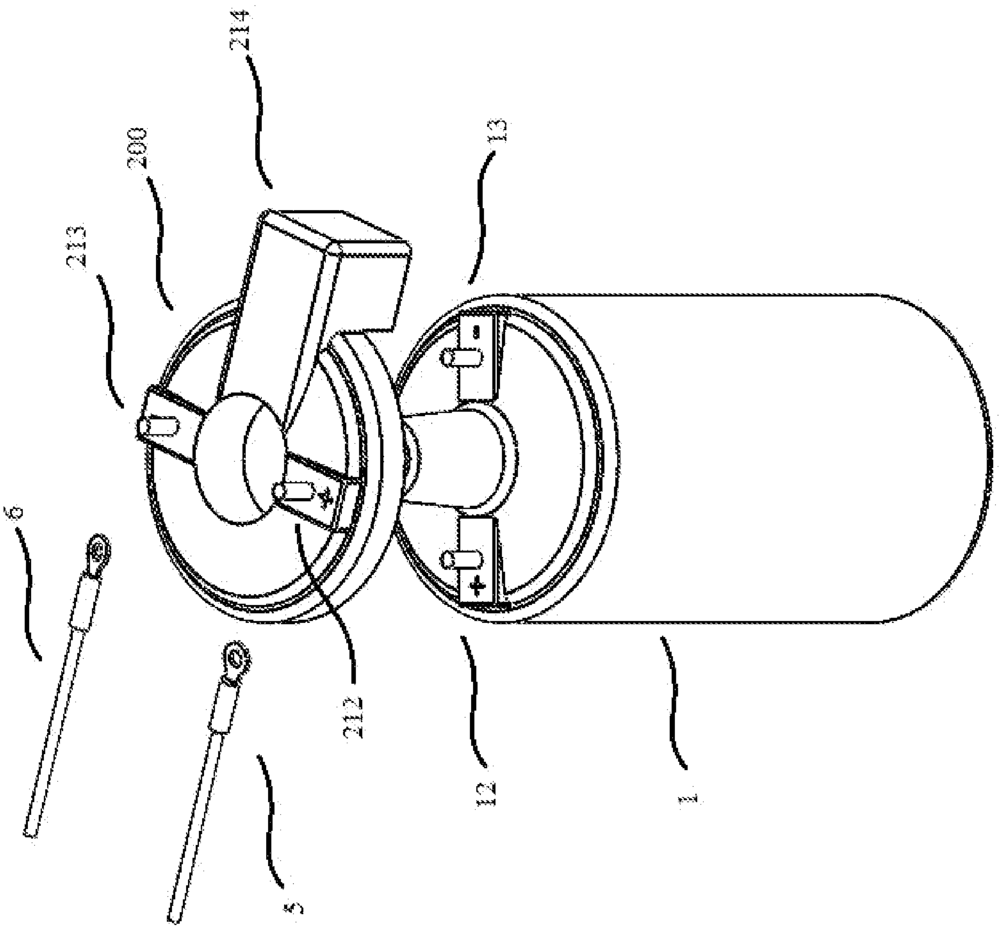
FIG. 4*a* shows an embodiment of a multiconfiguration coil cap and an automotive ignition coil.
Figure 4B:
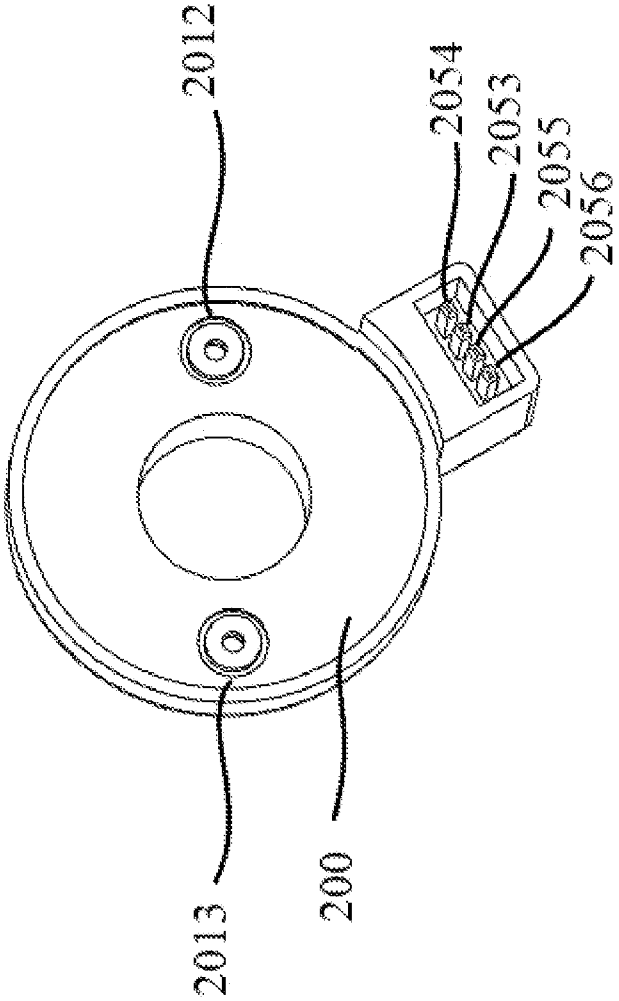
FIG. 4*b* shows an embodiment of an underside of a multiconfiguration coil cap.

FIG. 3 illustrates an embodiment of the multiconfiguration ignition coil 20 with a capacitive discharge ignition 8. In the embodiment shown, the multiconfiguration ignition coil 20 is a single unit within a housing comprising a transformer and internal wiring. The internal wiring is configured to redirect incoming signals out of the multiconfiguration ignition coil 20 and then accept those modified signals back into the multiconfiguration ignition coil 20 and direct them to the transformer. In some embodiments, the internal wiring is configured to accept a signal from the multiconfiguration ignition coil signal wire terminal, transmit the signal to the wire harness connector, accept a second signal from the wire harness connector that is able to control output from the multiconfiguration ignition coil high voltage output; accept a first voltage level from the multiconfiguration ignition coil power wire terminal, transmit the first voltage level to the wire harness connector, accept a second voltage level from the wire harness connector that is able to power the transformer; or both. In some embodiments, the multiconfiguration ignition coil 20 comprises a selector switch 250, which will allow the user to determine whether to bypass the modified signals and direct the unmodified incoming signals to the transformer or have the transformer receive the modified signals. In some embodiments, the modified signals can be selected from capacitive discharge ignition 8, a voltage booster 9, an ignition dwell controller 2, or a combination thereof. In some embodiments, the size and shape of the multiconfiguration ignition coil 20, except for wire harness connector 25, is preselected to substantially match that of the ignition coil 1 that it is intended to replace. In some embodiments, the outside of the cylindrical part of the housing is substantially the same as the corresponding part of the body 11. This will allow an installation that is as simple as unbolting and replacing the original ignition coil 1 with the multiconfiguration ignition coil 20 and then using a plug-in harness to electrically couple the multiconfiguration ignition coil 20 to a capacitive discharge ignition 8, a voltage booster 9, or an ignition dwell controller 2. In some embodiments, a wiring harness 7 will extend from the wire harness connector 25 (and in some embodiments, from the coil cap harness connector 214).

In some embodiments, in order to install, the power wire 5 and signal wire 6 are removed, the ignition coil 1 is unbolted, multiconfiguration ignition coil 20 is put in place, and attach the power wire 5 to the multiconfiguration ignition coil power wire terminal 22, the signal wire 6 to the multiconfiguration ignition coil signal wire terminal 23, connect the multiconfiguration ignition coil high voltage output 24, and any other wiring that was present. Given that the shape and size is substantially the same, no adjustment will need to be made to the existing wiring. While the wire harness connector 25 is shown as being integral with the multiconfiguration ignition coil 20, an alternative embodiment could include wires that act as the connector.

In some embodiments, the multiconfiguration ignition coil power wire terminal 22 (and the coil cap power input terminal 212) is electrically coupled to a battery, an alternator, an ignition switch, and/or relay of an internal combustion engine. In some embodiments, the multiconfiguration ignition coil signal wire terminal 23 (and the coil cap signal input terminal 213) is electrically coupled to a distribution, external ignition pickup, and/or a control unit of an internal combustion engine.

FIGS. **4*a* and 4*b* show an embodiment of the coil cap 200. The coil cap 200 is an adapter that is able to be placed on the ignition coil 1 and provides a coil cap harness connector 214 for easy connections. In some embodiments, the coil cap 200 comprises internal circuitry configured to redirect incoming signals out of the coil cap 200 and then accept those modified signals back into the coil cap 200 and direct them to the ignition coil 1. In some embodiments, the coil cap 200 comprises a selector switch 250, which will allow the user to determine whether to bypass the modified signals and direct the unmodified incoming signals to the ignition coil 1 or have the ignition coil 1 receive the modified signals. In some embodiments, the modified signals can be selected from capacitive discharge ignition 8, a voltage booster 9, an ignition dwell controller 2, or a combination thereof. In some embodiments, the coil cap 200 renders the combination of the ignition coil 1 and the coil cap 200 the equivalent of some embodiments of the multiconfiguration ignition coil 20. In some embodiments, the size and shape of the coil cap 200 will substantially match, correspond to, or both, the top of the ignition coil 1. This will enable the existing wiring in the automobile to be used without alteration. In some embodiments, the coil cap harness connector 214 comprises the selector switch 250** discussed below.

The coil cap 200 comprises a coil cap power input terminal 212, a coil cap signal input terminal 213; a coil cap harness connector 214; a coil cap power output terminal 2013; coil cap signal output terminal 2012; coil cap housing; and coil cap internal wiring. In some embodiments, the coil cap internal wiring is located inside the coil cap housing. In some embodiments, the coil cap 200 defines a hole to allow the high voltage output 14 to extend therethrough when the coil cap 200 is placed on the ignition coil 1. In some embodiments, the coil cap 200 will define a groove that extends from the edge to the center of the coil cap 200 that will allow for the coil cap 200 to be slid into place, while the high voltage output 14 moves along inside the groove until the coil cap 200 is put in place. In some embodiments, the coil cap signal output terminal 2012 is configured to have the power wire input terminal 12 reside therein, and the coil cap power output terminal 2013 is configured to have the signal wire input terminal 13 reside therein when the coil cap 200 is placed on the ignition coil 1. In some embodiments, the coil cap signal output terminal 2012 is electrically coupled to the power wire input terminal 12, and the coil cap power output terminal 2013 is electrically coupled to the signal wire input terminal 13 when the coil cap 200 is placed on the ignition coil 1. In some embodiments, the connection between the coil cap signal output terminal 2012 to the power wire input terminal 12, and the coil cap power output terminal 2013 to the signal wire input terminal 13 will not require any additional wiring or connections. This will greatly will help reduce any installation mistakes. The cap will also comprise a terminal opening that will allow the high voltage output 14 to extend therethrough. In some embodiments, the coil cap harness connector 214 comprises a socket for a wiring harness 7. In some embodiments, the coil cap harness connector 214 comprises cap harness signal output 2056, cap harness power output 2055, cap harness power input 2053, and cap harness signal input 2054.

Figure 5:
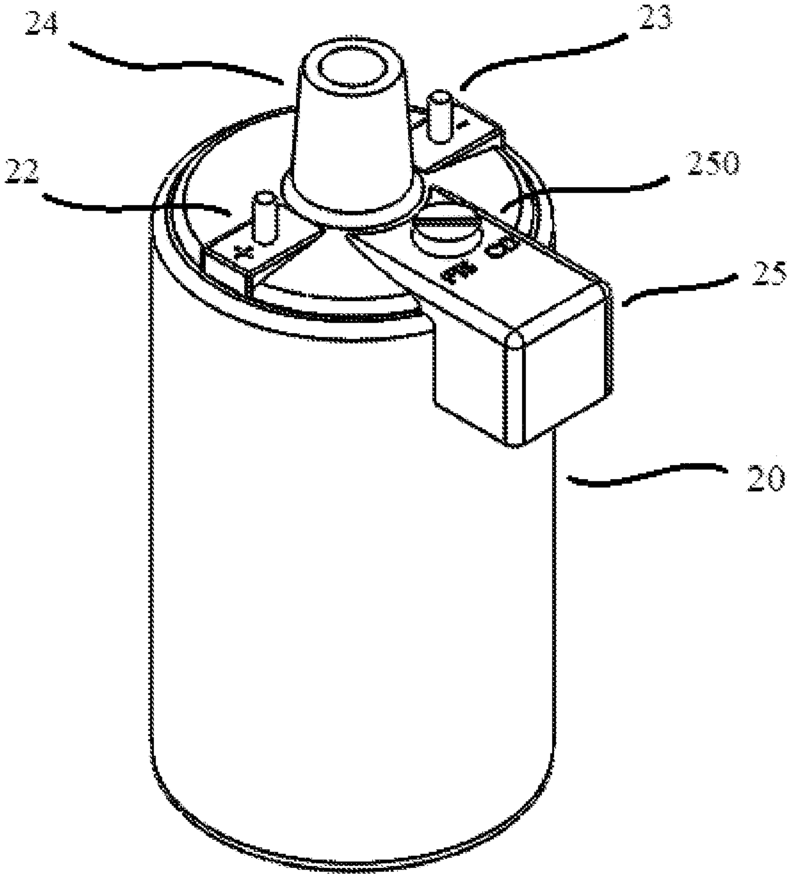
FIG. 5 shows an embodiment of a multiconfiguration coil.

FIG. 5 shows an embodiment of the multiconfiguration ignition coil 20 with a wire harness connector 25 comprising a selector switch 250 that would allow the user to select how the multiconfiguration ignition coil 20 functions. In some embodiments, the selector switch 250 allows the user to direct the internal wiring of the multiconfiguration ignition coil 20 (or the coil cap 200) to select the use of an external capacitive discharge ignition 8, an external voltage booster 9, an external ignition dwell controller 2, bypass, or a combination thereof. In some combinations, the selector switch 250 can have a bypass position will allow the user to bypass the wire harness connector 25 (or the coil cap harness connector 214) and supply the first signal and the first voltage level to the transformer (or the ignition coil 1). While the selector switch 250 is shown with two options, it is understood that two or more options can be provided. In some embodiments, the options amount to three and include sections that output to three of the following: capacitive discharge ignition 8, a voltage booster 9, an ignition dwell controller 2, and bypass. In some embodiments, the options amount to two and include a combination of a capacitive discharge ignition 8, a voltage booster 9, ignition dwell controller 2, and bypass.

Figure 6:
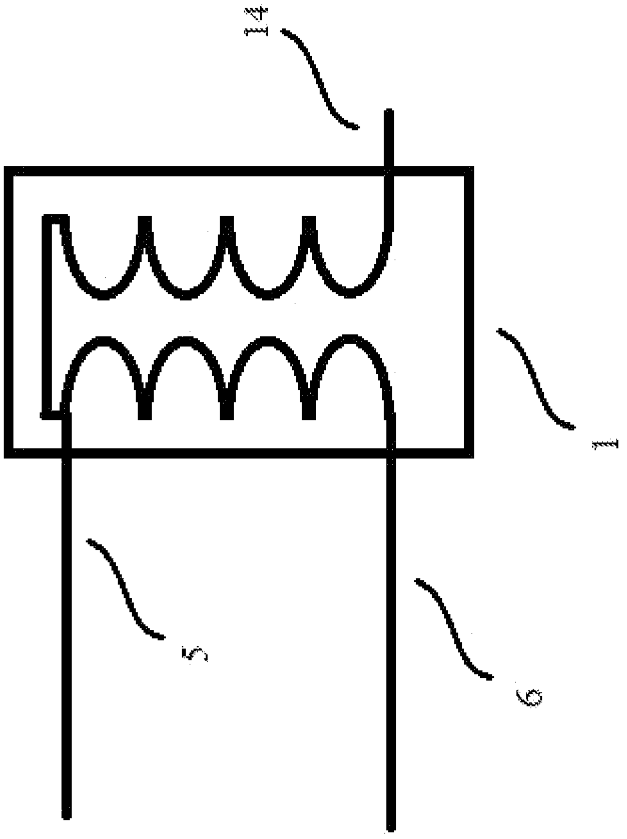
FIGURE 6 (PRIOR ART)
FIG. 6 shows an electrical schematic of a typical ignition coil according to the prior art.

FIG. 6 shows a schematic of an ignition coil 1 according to the prior art.

Figure 7:
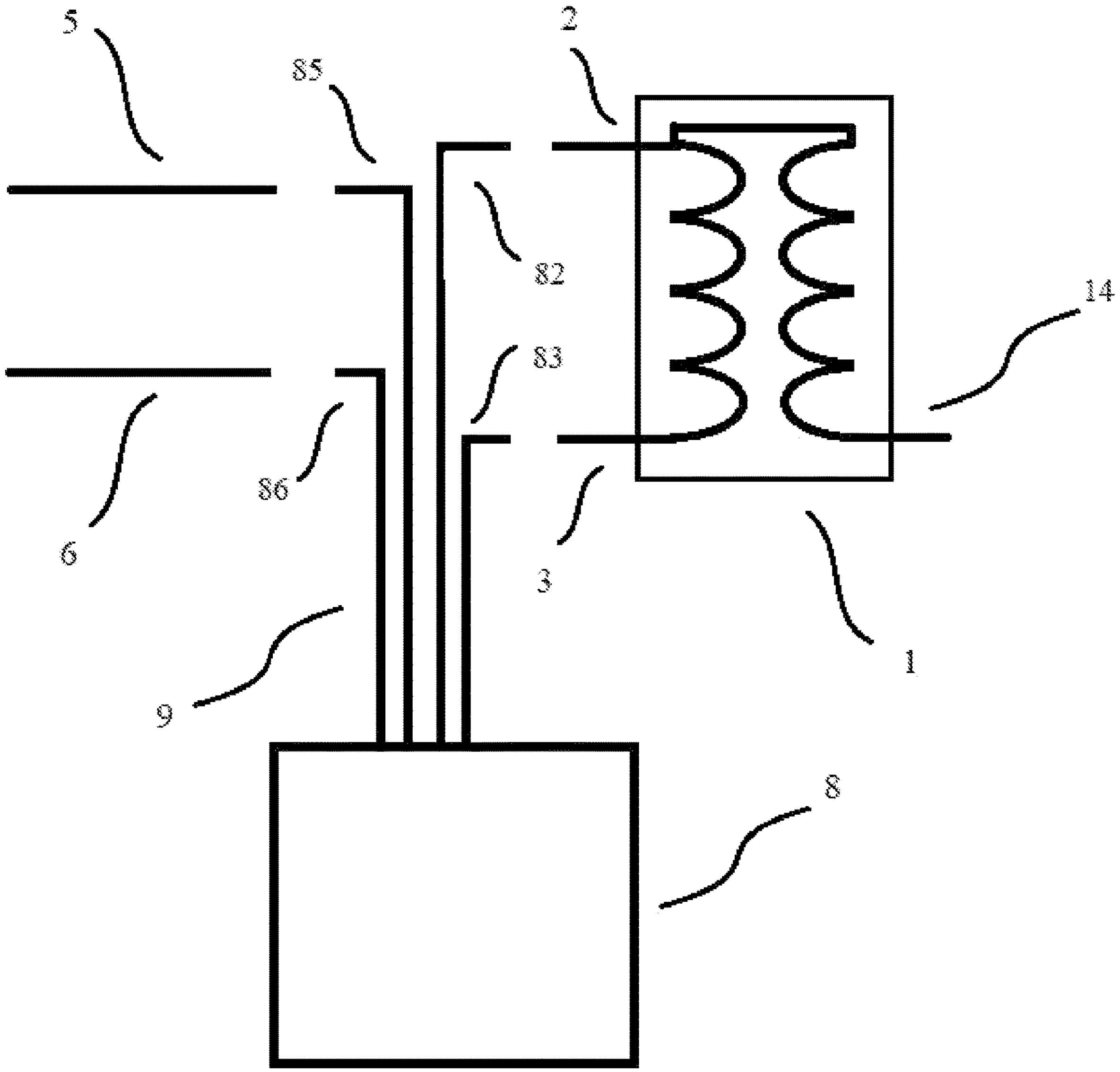
FIGURE 7 (PRIOR ART)
FIG. 7 shows an electrical schematic of a typical ignition coil with a capacitive discharge ignition according to the prior art.

FIG. 7 shows a schematic of an ignition coil 1 and a capacitive discharge ignition 8 installed according to prior art.

Figure 8:
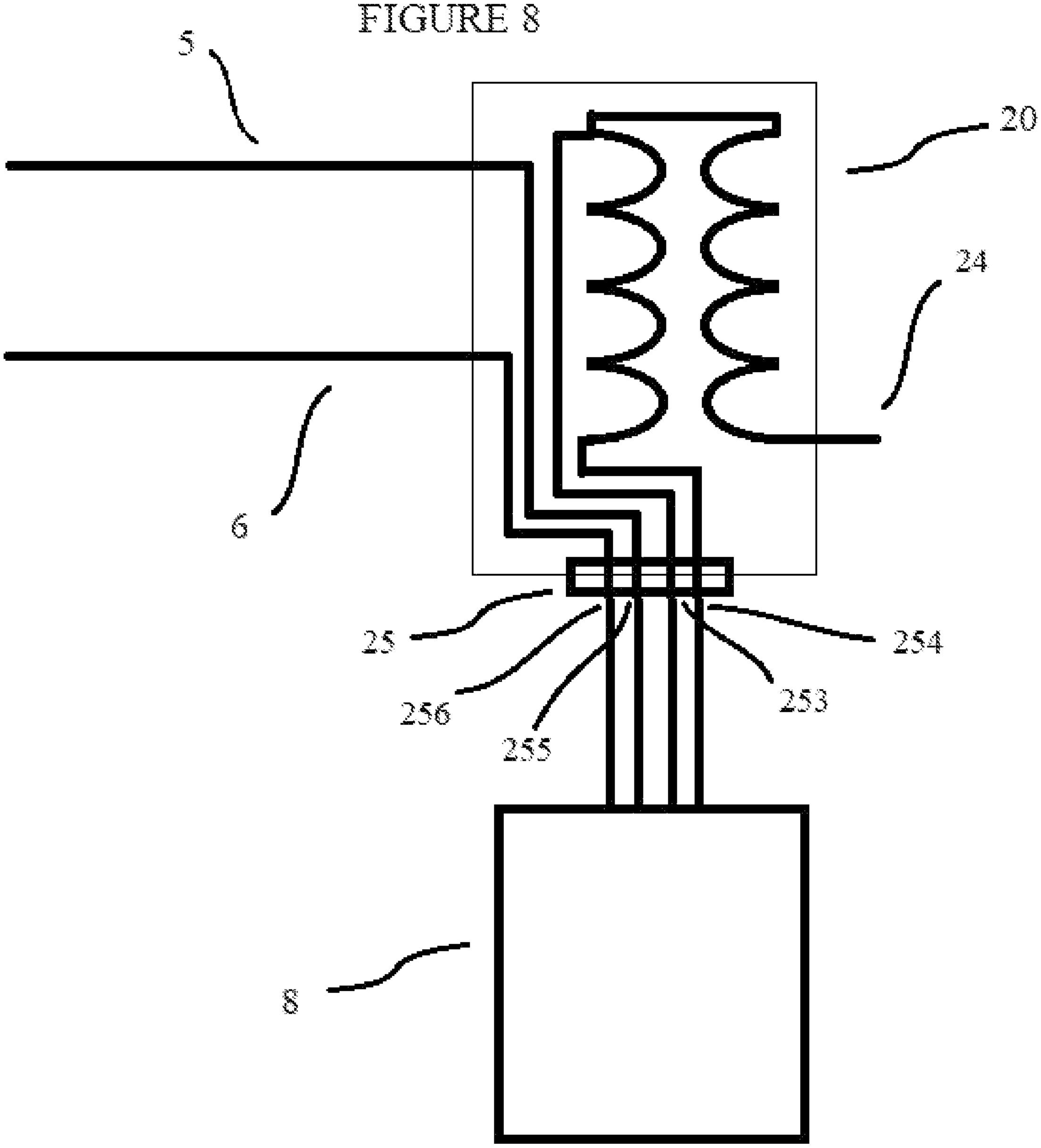
FIG. 8 shows an electrical schematic of an embodiment of the multiconfiguration coil and a capacitive discharge ignition.

FIG. 8 shows a schematic of an embodiment of a multiconfiguration ignition coil 20 and a capacitive discharge ignition 8. The multiconfiguration ignition coil 20 comprises a wire harness connector 25. The wire harness connector 25 comprises a harness signal output 256, harness power output 255, harness power input 253, and harness signal input 254.

Figure 9:
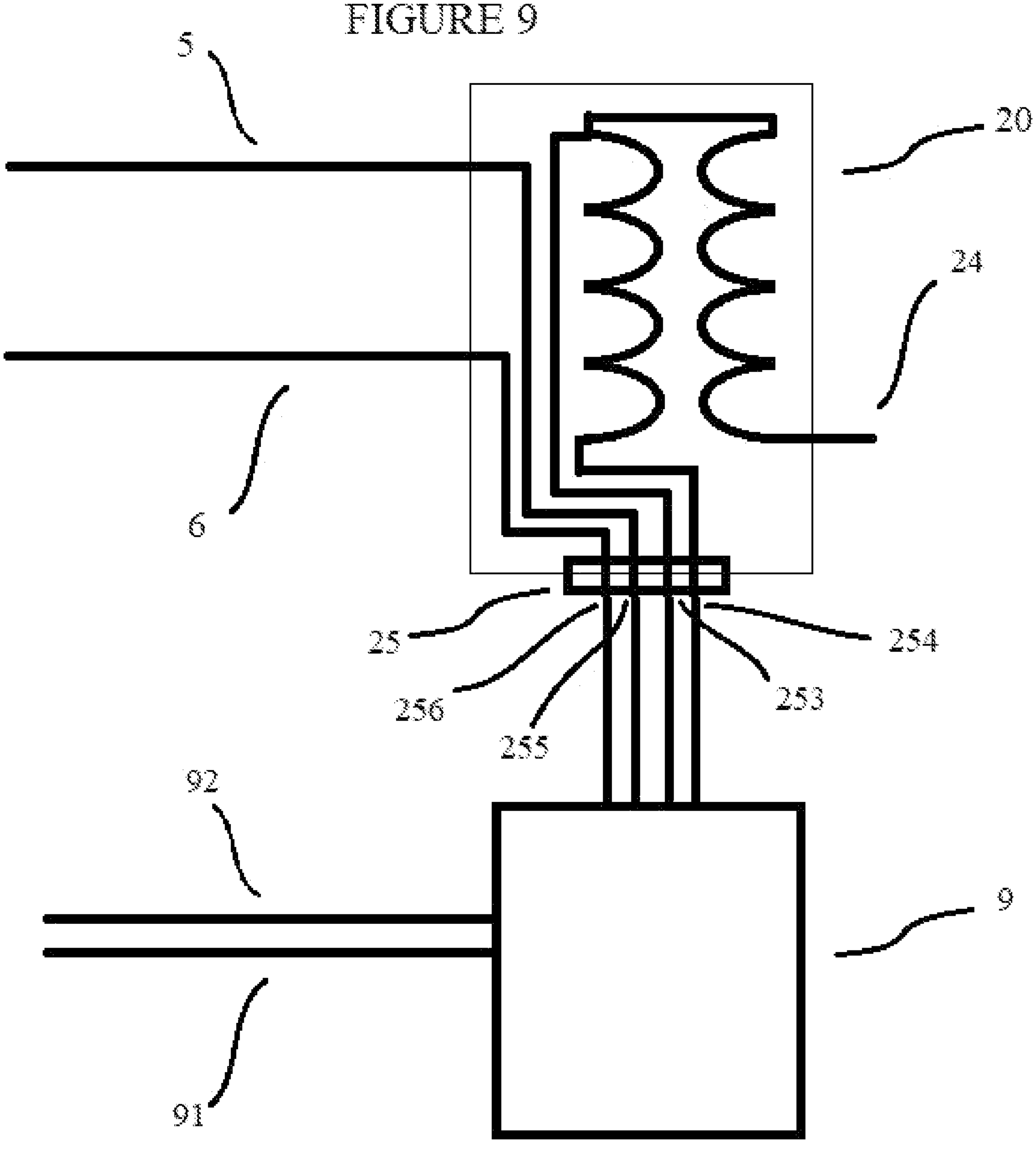
FIG. 9 shows an electrical schematic of an embodiment of the multiconfiguration coil and a voltage booster.

FIG. 9 shows a schematic of an embodiment of a multiconfiguration ignition coil 20 and a voltage booster 9.

Figure 10:
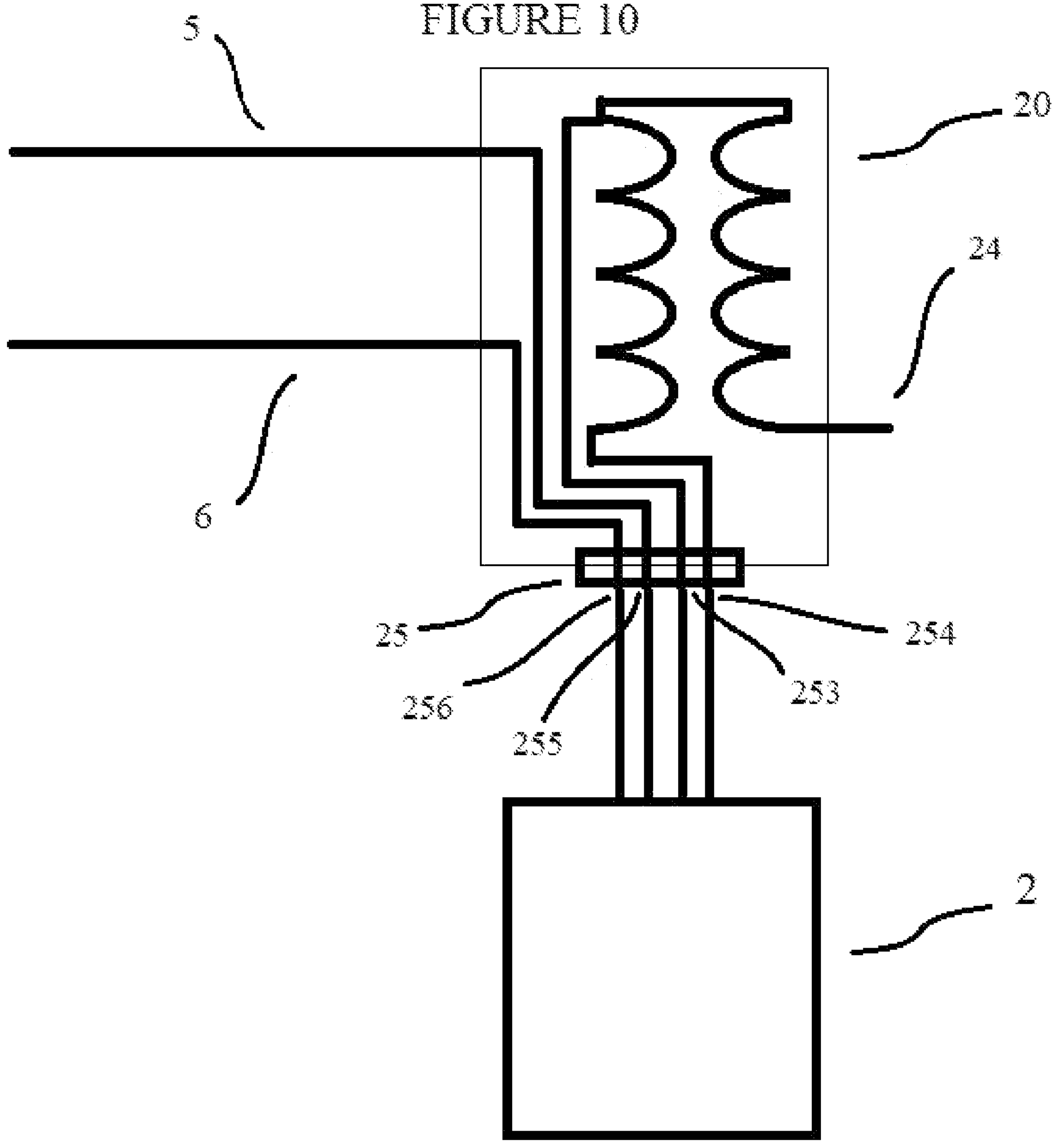
FIG. 10 shows an electrical schematic of an embodiment of the multiconfiguration coil and an ignition dwell controller.

FIG. 10 shows a schematic of an embodiment of a multiconfiguration ignition coil 20 and ignition dwell controller 2.

As can be seen in FIGS. 3, 5, and 8-9, the internal wiring of the multiconfiguration ignition coil 20 can be located in the housing. This is done to decrease the chance of installation error.

In some embodiments, the multiconfiguration ignition coil 20 and the coil cap 200 will comprise an integral capacitive discharge ignition 8, a voltage booster 9, an ignition dwell controller 2, or a combination thereof. The integral capacitive discharge ignition 8, a voltage booster 9, an ignition dwell controller 2, or a combination thereof can be located inside the housing. In some embodiments, the multiconfiguration ignition coil 20 and the coil cap 200 will not have a wire harness connector 25 or coil cap harness connector 214, and the multiconfiguration ignition coil 20 and the coil cap 200 will be directly wired to a capacitive discharge ignition 8, a voltage booster 9, an ignition dwell controller 2, or a combination thereof.

Example methods are provided by way of example, as there are a variety of ways to carry out the method. The method described below can be carried out using the configurations illustrated in FIGS. 3, 4*a*, 4*b*, 5, and/or 8-10, for example, and various elements of these figures are referenced in explaining the example methods. Additional steps can be added, or fewer steps may be utilized without departing from this disclosure.

Some embodiments of a method comprise:

101) Identifying the ignition coil 1;

102) Providing a multiconfiguration ignition coil 20 that has substantially the same size and shape as the ignition coil 1;

103) Removing the ignition coil 1; and

104) Installing the multiconfiguration ignition coil 20.

In some embodiments, the removing the ignition coil 1 comprises removing the power wire 5 from power wire input terminal 12 and the signal wire 6 from the signal wire input terminal 13.

In some embodiments, the installing the multiconfiguration ignition coil 20 comprises securing the power wire 5 to the multiconfiguration ignition coil power wire terminal 22 and the signal wire 6 to the multiconfiguration ignition coil signal wire terminal 23. Some embodiments further comprise connecting the multiconfiguration ignition coil 20 to a capacitive discharge ignition 8, a voltage booster 9, an ignition dwell controller 2, or a combination thereof.

Some embodiments further comprise adjusting the selector switch 250.

Some embodiments of a method comprise:

201) Identifying the ignition coil 1;

202) Providing a coil cap 200, wherein the coil cap 200 is configured to sit on top of the ignition coil 1, accept the power wire input terminal 12 inside the coil cap power output terminal 2013, and accept the signal wire input terminal 13 inside the coil cap signal output terminal 2012; and

203) Installing the coil cap 200.

Some embodiments further comprise removing the power wire 5 from power wire input terminal 12 and the signal wire 6 from the signal wire input terminal 13.

In some embodiments, the installing the coil cap 200 comprises placing the coil cap 200 on the ignition coil 1 such that the power wire input terminal 12 is inserted inside the coil cap power output terminal 2013, and the signal wire input terminal 13 is inserted inside the coil cap signal output terminal 2012. In some embodiments, installing the coil cap 200 comprises securing the power wire 5 to the coil cap power input terminal 212 and the signal wire 6 to the coil cap signal input terminal 213. Some embodiments further comprise connecting the coil cap 200 to a capacitive discharge ignition 8, a voltage booster 9, an ignition dwell controller 2, or a combination thereof.

Some embodiments further comprise adjusting the selector switch 250.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however, it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:
an ignition coil comprising:
an ignition coil high voltage output;
a coil cap comprising:
a coil cap housing;
a coil cap power input terminal;
a coil cap signal input terminal;
a coil cap signal output terminal;
a coil cap power output terminal;
a coil cap harness connector; and
a coil cap internal wiring;
wherein the coil cap internal wiring is located in the coil cap housing;
the coil cap power input terminal and the coil cap signal input terminal are accessible from the exterior of the coil cap housing;
the coil cap defines an opening;
wherein the coil cap is coupled to the ignition coil and the ignition coil high voltage output extends though the opening; and
the coil cap internal wiring is configured to accept a first signal from the coil cap signal input terminal, transmit the first signal to the coil cap harness connector, accept a second signal from the coil cap harness connector and transmit to the coil cap signal output terminal; accept a first voltage level from the coil cap power input terminal, transmit the first voltage level to the coil cap harness connector, accept a second voltage level from the coil cap harness connector and transmit the second voltage level to the coil cap power output terminal; or both.

2. The apparatus of claim 1, further comprising a capacitive discharge ignition electrically coupled to the coil cap; a voltage booster electrically coupled to the coil cap; an ignition dwell controller electrically coupled to the coil cap; or a combination thereof.

3. The apparatus of claim 2, wherein the coil cap power input terminal is insulated from the coil cap power output terminal and the coil cap signal input terminal is insulated from the coil cap signal output terminal.

4. The apparatus of claim 2, wherein the coil cap power input terminal is electrically coupled to a battery, an alternator, an ignition switch, a relay, or a combination thereof.

5. The apparatus of claim 2, wherein the coil cap signal input terminal is electrically coupled to a distributor, an external ignition pickup, a control unit, or a combination thereof.

6. The apparatus of claim 2, wherein the coil cap further comprises a selector switch that is configured to selectively direct the first signal, the first voltage level, or both to the capacitive discharge ignition, the voltage booster, or the ignition dwell controller.

7. The apparatus of claim 6, wherein the selector switch is further configured to selectively select a bypass position, wherein in the bypass position, the first signal and the first voltage level are directed to the ignition coil.

8. The apparatus of claim 1, wherein the ignition coil comprises a power wire input terminal and a signal wire input terminal; and the coil cap signal output terminal is electrically coupled to the power wire input terminal, and the coil cap power output terminal is electrically coupled to the signal wire input terminal.

9. The apparatus of claim 8, wherein the coil cap signal output terminal is located inside the power wire input terminal, and the coil cap power output terminal is located inside the signal wire input terminal.

* * * * *